(12) United States Patent
Kamen et al.

(10) Patent No.: US 7,407,175 B2
(45) Date of Patent: Aug. 5, 2008

(54) MULTIPLE-PASSENGER TRANSPORTER

(75) Inventors: Dean Kamen, Bedford, NH (US); J. Douglas Field, Bedford, NH (US); John David Heinzmann, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 303 days.

(21) Appl. No.: 11/233,276

(22) Filed: Sep. 22, 2005

(65) Prior Publication Data

US 2006/0011398 A1 Jan. 19, 2006

Related U.S. Application Data

(60) Continuation-in-part of application No. 10/626,468, filed on Jul. 24, 2003, which is a division of application No. 10/618,914, filed on Jul. 14, 2003, now Pat. No. 6,969,079, which is a continuation-in-part of application No. 10/164,333, filed on Jun. 5, 2002, now abandoned, which is a continuation-in-part of application No. 10/164,333, filed on Jun. 5, 2002, now abandoned, which is a division of application No. 09/516,384, filed on Mar. 1, 2000, now Pat. No. 6,435,535.

(51) Int. Cl.
*B62K 27/00* (2006.01)

(52) U.S. Cl. .................. 280/204; 280/492; 280/458; 180/218

(58) Field of Classification Search .......... 280/204, 280/292, 492, 494, 504, 400, 458, 456.1, 280/426; 180/218, 21
See application file for complete search history.

(56) References Cited

U.S. PATENT DOCUMENTS 584,127 A 6/1897 Draullette et al.

(Continued)

FOREIGN PATENT DOCUMENTS

DE 2048593 5/1971

(Continued)

OTHER PUBLICATIONS

Kawaji, *Stabilization of Unicycle Using Spinning Motion* (English Translation), Denki Gakkai Ronbushi. D, vol. 107-D, Issue No. 1, pp. 1-23, Japan (Jan. 1987).

(Continued)

*Primary Examiner*—Paul N. Dickson
*Assistant Examiner*—John D Walters
(74) *Attorney, Agent, or Firm*—McCormick, Paulding & Huber LLP

(57) ABSTRACT

A transporter for transporting a first person and one or more riders over a surface. The transporter includes a first support platform for supporting the first person, the first support platform having left and right sides and defining a fore-aft vertical plane and a lateral plane. At least one ground-contacting element is coupled to the first support platform such that the first support platform is capable of tilting in the fore-aft plane about a tilt axis. The at least one ground-contacting element is driven by a motorized drive arrangement so as to cause locomotion of the transporter. A controller commands the motorized drive arrangement. The controller is configured so that at least one of fore and aft sustained motion of the transporter is based at least on fore-aft tilting of the first support platform. One or more passenger platforms support one or more riders, the passenger platforms coupled to the first support platform such that fore-aft tilting of the first support platform is substantially independent of the one or more passenger platforms.

8 Claims, 9 Drawing Sheets

U.S. PATENT DOCUMENTS

| | | | |
|---|---|---|---|
| 849,270 A | 4/1907 | Schafer et al. | |
| 1,739,716 A * | 12/1929 | Fisher | 280/78 |
| 2,742,973 A | 4/1956 | Johannesen | 180/8 |
| 3,145,797 A | 8/1964 | Taylor | 180/21 |
| 3,260,324 A | 7/1966 | Suarez | 180/10 |
| 3,283,398 A | 11/1966 | Andren | 29/155.55 |
| 3,288,234 A | 11/1966 | Feliz | 180/6.5 |
| 3,348,518 A | 10/1967 | Forsyth et al. | 115/1 |
| 3,374,845 A | 3/1968 | Selwyn | 180/6.5 |
| 3,387,859 A | 6/1968 | McClellan | 280/204 |
| 3,399,742 A | 9/1968 | Malick | 180/21 |
| 3,446,304 A | 5/1969 | Alimanestiano | 180/9.24 |
| 3,450,219 A | 6/1969 | Fleming | 180/8 |
| 3,515,401 A | 6/1970 | Gross | 280/5.26 |
| 3,580,344 A | 5/1971 | Floyd | 180/8 A |
| 3,596,298 A | 8/1971 | Durst, Jr. | 5/81 |
| 3,724,874 A | 4/1973 | Simpson | 280/408 |
| 3,860,264 A | 1/1975 | Douglas et al. | 280/266 |
| 3,872,945 A | 3/1975 | Hickman et al. | 180/65 R |
| 3,952,822 A | 4/1976 | Udden et al. | 180/21 |
| 4,018,440 A | 4/1977 | Deutsch | 272/70.3 |
| 4,062,558 A | 12/1977 | Wasserman | 280/205 |
| 4,076,270 A | 2/1978 | Winchell | 280/220 |
| 4,088,199 A | 5/1978 | Trautwein | 180/25 R |
| 4,094,372 A | 6/1978 | Notter | 180/1 G |
| 4,109,741 A | 8/1978 | Gabriel | 180/21 |
| 4,111,445 A | 9/1978 | Haibeck | 280/79.3 |
| 4,151,892 A | 5/1979 | Francken | 180/77 H |
| 4,222,449 A | 9/1980 | Feliz | 180/8 A |
| 4,264,082 A | 4/1981 | Fouchey, Jr. | 280/5.26 |
| 4,266,627 A | 5/1981 | Lauber | 180/8 B |
| 4,293,052 A | 10/1981 | Daswick et al. | 180/219 |
| 4,325,565 A | 4/1982 | Winchell | 280/282 |
| 4,354,569 A | 10/1982 | Eichholz | 180/214 |
| 4,363,493 A | 12/1982 | Veneklasen | 280/11.2 |
| 4,373,600 A | 2/1983 | Buschbom et al. | 180/212 |
| 4,375,840 A | 3/1983 | Campbell | 180/6.5 |
| 4,510,956 A | 4/1985 | King | 135/67 |
| 4,560,022 A | 12/1985 | Kassai | 180/65.1 |
| 4,566,707 A | 1/1986 | Nitzberg | 180/8.2 |
| 4,570,078 A | 2/1986 | Yashima et al. | 307/10 R |
| 4,571,844 A | 2/1986 | Komasaku et al. | |
| 4,624,469 A | 11/1986 | Bourne, Jr. | 280/112 A |
| 4,645,230 A | 2/1987 | Hammons | 280/656 |
| 4,657,272 A | 4/1987 | Davenport | 280/266 |
| 4,685,693 A | 8/1987 | Vadjunec | 280/242 WC |
| 4,709,772 A | 12/1987 | Brunet | 180/8.2 |
| 4,716,980 A | 1/1988 | Butler | 180/9.2 |
| 4,740,001 A | 4/1988 | Torleumke | 280/11.115 |
| 4,746,132 A | 5/1988 | Eagan | 280/1.13 |
| 4,770,410 A | 9/1988 | Brown | 272/70.3 |
| 4,786,069 A | 11/1988 | Tang | 280/221 |
| 4,790,400 A | 12/1988 | Sheeter | 180/8.6 |
| 4,790,548 A | 12/1988 | Decelles et al. | 280/5.26 |
| 4,794,999 A | 1/1989 | Hester | 180/8.2 |
| 4,798,255 A | 1/1989 | Wu | 180/65.1 |
| 4,802,542 A | 2/1989 | Houston et al. | 180/65.5 |
| 4,809,804 A | 3/1989 | Houston et al. | 180/65.5 |
| 4,834,200 A | 5/1989 | Kajita | 180/8.1 |
| 4,863,182 A | 9/1989 | Chern | 280/266 |
| 4,867,188 A | 9/1989 | Reid | 135/67 |
| 4,869,279 A | 9/1989 | Hedges | 135/67 |
| 4,874,055 A | 10/1989 | Beer | 180/19.2 |
| 4,890,853 A | 1/1990 | Olson | 280/87.021 |
| 4,919,225 A | 4/1990 | Sturges | 180/210 |
| 4,953,851 A | 9/1990 | Sherlock et al. | 272/703 |
| 4,984,754 A | 1/1991 | Yarrington | 244/2 |
| 4,985,947 A | 1/1991 | Ethridge | 5/81 R |
| 4,998,596 A | 3/1991 | Miksitz | 180/213 |
| 5,002,295 A | 3/1991 | Lin | 280/205 |
| 5,011,170 A | 4/1991 | Forbes et al. | 280/204 |
| 5,011,171 A | 4/1991 | Cook | 280/221 |
| 5,052,237 A | 10/1991 | Reimann | 74/335 |
| 5,064,209 A | 11/1991 | Kurschat | 280/204 |
| 5,111,899 A | 5/1992 | Reimann | 180/65.1 |
| 5,158,493 A | 10/1992 | Morgrey | 446/355 |
| 5,161,820 A | 11/1992 | Vollmer | 280/730 |
| 5,168,947 A | 12/1992 | Rodenborn | 180/19.1 |
| 5,171,173 A | 12/1992 | Henderson et al. | 440/7 |
| 5,186,270 A | 2/1993 | West | 180/6.62 |
| 5,221,883 A | 6/1993 | Takenaka et al. | 318/568.12 |
| 5,240,266 A | 8/1993 | Kelley et al. | 280/204 |
| 5,241,875 A | 9/1993 | Kochanneck | 74/479 BP |
| 5,248,007 A | 9/1993 | Watkins et al. | 180/9.32 |
| 5,314,034 A | 5/1994 | Chittal | 180/21 |
| 5,350,033 A | 9/1994 | Kraft | 180/167 |
| 5,366,036 A | 11/1994 | Perry | 180/65.1 |
| 5,376,868 A | 12/1994 | Toyoda et al. | 318/587 |
| 5,419,624 A | 5/1995 | Adler et al. | 303/112 |
| 5,427,390 A | 6/1995 | Duncan et al. | 280/8 |
| 5,641,173 A | 6/1997 | Cobb, Jr. | 280/204 |
| 5,655,615 A | 8/1997 | Mick | 180/24.02 |
| 5,701,965 A | 12/1997 | Kamen et al. | 180/7.1 |
| 5,701,968 A | 12/1997 | Wright-Ott et al. | 180/65.1 |
| 5,718,534 A | 2/1998 | Neuling | 404/94 |
| 5,775,452 A | 7/1998 | Patmont | 180/181 |
| 5,791,425 A | 8/1998 | Kamen et al. | 180/7.1 |
| 5,794,730 A | 8/1998 | Kamen | 180/7.1 |
| 5,873,582 A | 2/1999 | Kaufman et al. | 280/7.12 |
| 5,921,844 A | 7/1999 | Hollick | 446/450 |
| 5,947,505 A | 9/1999 | Martin | 280/493 |
| 5,971,091 A | 10/1999 | Kamen et al. | 180/218 |
| 5,973,463 A | 10/1999 | Okuda et al. | 318/430 |
| 5,975,225 A | 11/1999 | Kamen et al. | 180/7.1 |
| 5,986,221 A | 11/1999 | Stanley | 177/136 |
| 6,003,624 A | 12/1999 | Jorgensen et al. | 180/6.5 |
| 6,039,142 A | 3/2000 | Eckstein et al. | 180/333 |
| 6,050,357 A | 4/2000 | Staelin et al. | 180/65.1 |
| 6,059,062 A | 5/2000 | Staelin et al. | 180/181 |
| 6,125,957 A | 10/2000 | Kauffmann | 180/65.1 |
| 6,131,057 A | 10/2000 | Tamaki et al. | 701/22 |
| 6,223,104 B1 | 4/2001 | Kamen et al. | 701/1 |
| 6,225,977 B1 | 5/2001 | Li | 345/156 |
| 6,288,505 B1 | 9/2001 | Heinzmann et al. | 318/139 |
| 6,302,230 B1 | 10/2001 | Kamen et al. | 180/171 |
| 6,312,001 B1 | 11/2001 | Boyer | 280/282 |
| 6,435,535 B1 | 8/2002 | Field et al. | 280/204 |
| 6,561,294 B1 | 5/2003 | Kamen et al. | 180/21 |
| 6,651,766 B2 | 11/2003 | Kamen et al. | 180/218 |
| 6,779,621 B2 | 8/2004 | Kamen et al. | 180/282 |
| 6,969,079 B2 | 11/2005 | Kamen et al. | 280/204 |
| 7,000,933 B2 | 2/2006 | Arling et al. | 280/204 |
| 2002/0063006 A1 | 5/2002 | Kamen et al. | 180/171 |

FOREIGN PATENT DOCUMENTS

| | | |
|---|---|---|
| DE | 3128112 | 2/1983 |
| DE | 32 42 880 | 6/1983 |
| DE | 3411489 | 4/1984 |
| DE | 44 04 594 | 8/1995 |
| DE | 196 25 498 | 11/1997 |
| DE | 298 08 091 | 8/1998 |
| DE | 298 08 096 | 8/1998 |
| EP | 0 109 927 | 5/1984 |
| EP | 0 193 473 | 9/1986 |
| EP | 0 537 698 | 4/1993 |
| EP | 0 663 312 | 7/1995 |
| EP | 0 663 313 | 7/1995 |
| EP | 0 958 978 | 11/1999 |
| FR | 980 237 | 5/1951 |
| FR | 2 502 090 | 3/1982 |
| GB | 152664 | 2/1922 |
| GB | 1213930 | 11/1970 |
| GB | 2 139 576 | 11/1984 |

| | | |
|---|---|---|
| JP | 57-87766 | 6/1982 |
| JP | 57-110569 | 7/1982 |
| JP | 59-73372 | 4/1984 |
| JP | 63-305082 | 12/1988 |
| JP | 2-55580 | 2/1990 |
| JP | 2-190277 | 7/1990 |
| JP | 4-201793 | 7/1992 |
| JP | 5-213240 | 8/1993 |
| JP | 5-244933 | 9/1993 |
| JP | 6-105415 | 4/1994 |
| JP | 6-131685 | 5/1994 |
| JP | 6-171562 | 6/1994 |
| JP | 6-212810 | 8/1994 |
| JP | 7-255780 | 10/1995 |
| WO | WO 86/05752 | 10/1986 |
| WO | WO 89/06117 | 7/1989 |
| WO | WO 96/23478 | 8/1996 |
| WO | WO 98/46474 | 10/1998 |
| WO | WO 00/75001 | 12/2000 |

OTHER PUBLICATIONS

Schoonwinkel, *Design and Test of a Computer-Stabilized Unicycle*, Stanford University, UMI Dissertation Services, pp. 1-376 (Dec. 1987).

Vos, *Dynamics and Nonlinea,r Adaptive Control of an Autonomous Unicycle*, Massachusetts Institute of Technology, pp. 1-170 (May 1989).

Vos, *Nonlinear Control of an Autonomous Unicycle Robot: Practical Issues*, Massachusetts Institute of Technology, pp. 1-207 (Jun. 1992).

Koyanagi et al, A *Wheeled Inverse Pendulum Type Self-Contained Mobile Robot and its Posture Control and Vehicle Control* [Japanese Language], The Society of Instrument and Control Engineers, Special issue of the 31st SICE Annual Conference, Japan, pp. 13-16 (Jun. 1992).

Koyanagi et al, *A Wheeled Inverse Pendulum Type Self-Contained Mobile Robot* [Japanese Language], The Society of Instrument and Control Engineers, Special issue of the 31st SICE Annual Conference, pp. 51-56 (1992).

Koyanagi et al, *A Wheeled Inverse Pendulum Type Self-Contained Mobile Robot and Its Two Dimensional Trajectory Control*, Proceeding of the Second International Symposium on Measurement and Control in Robotics, Japan, pp. 891-897 (1992) [Abstract].

Watson Industries, Inc., Vertical Reference Manual ADS-C132-1A/ADS-C232-1A, 2 Pages (1992).

Misc. News Article, *Amazing Wheelchair Goes Up and Down Stairs*, 1 Page.

Osaka et al, *Stabilization of Unicycle, Systems and Control*, vol. 25, Issue No. 3, Japan, pp. 159-166 (Mar. 1981) [Abstract].

Roy et al, *Five-Wheel Unicycle System*, Medical & Biological Engineering & Computing, vol. 23, Issue No. 6, pp. 593-596, United Kingdom (1985) [Abstract].

Kawaji, *Stabilization of Unicycle Using Spinning Motion*, Denki Gakkai Ronbushi, D, vol. 107, Issue No. 1, Japan, pp. 21-28 (Jan. 1987) [Abstract].

Schoonwinkel, *Design and Test of a Computer-Stabilized Unicycle*, Dissertation Abstracts International, vol. 49/03-B, pp. 890-1294, Stanford University (1988) [Abstract].

Vos et al, *Dynamics and Nonlinear Adaptive Control of an Autonomous Unicycle—Theory and Experiment*, American Institute of Aeronautics and Astronautics, A90-26772 10-39, pp. 487-494, Washington, D.C. (1990) [Abstract].

Tecknico's Home Page, *Those Amazing Flying Machines*, http://www.swiftsite.com/technico, pp. 1-4.

Stew's Hovercraft Page, http://www.stewcam.com/hovercraft.html, pp. 1-7.

Kanoh, *Adaptive Control of Inverted Pendulum*, Computrol, vol. 2, pp. 69-75 [Japanese Language]/ 14 Pages [English Translation] (1983).

Yamafuji, A *Proposal for Modular-Structured Mobile Robots for Work that Principally Involve a Vehicle with Two Parallel Wheels*, Automation Technology, vol. 20, pp. 113-118 [Japanese Language]/pp. 1-13 [English Translation] (1988).

Yamafuji et al, *Study of Postural and Driving Control of Coaxial Bicycle*, Paper Read at Meeting of Japan Society of Mechanical Engineering (Series C), vol. 54, Issue No. 501, pp. 1114-1121 [Japanese Language]/ 14 Pages [English Translation] (May 1988).

Yamafuji et al, *Synchronous Steering Control of a Parallel Bicycle*, Paper Read at Meeting of Japan Society of Mechanical Engineering (Series C), vol. 55, Issue No. 513, pp. 1229-1234 [Japanese Language]/ 10 Pages [English Translation] (May 1989).

Momoi et al, *Motion Control of Parallel Bicycle-Type Mobile Robot Composed of a Triple Inverted Pendulum*, Paper Read at Meeting of Japan Society of Mechanical Engineering (Series C), vol. 57, Issue No. 541, pp. 2938-2943 [Japanese Language]/ 12 Pages [English Translation] (Sep. 1991).

* cited by examiner

MULTIPLE-PASSENGER TRANSPORTER

The present application is a divisional of U.S. patent application Ser. No. 10/618,914, filed Jul. 14, 2003, now U.S. Pat. No. 6,969,079 which is a continuation-in-part of U.S. application Ser. No. 10/164,333, filed Jun. 5, 2002 now abandoned. The present application is also a continuation-in-part of U.S. patent application Ser. No. 10/626,468, filed Jul. 24, 2003, which is a continuation-in-part of U.S. patent application Ser. No. 10/164,333, filed Jun. 5, 2002, now abandoned which is a divisional of U.S. patent application Ser. No. 09/516,384, filed Mar. 1, 2000, and which is now U.S. Pat. No. 6,435,535. All of the aforementioned patents and patent applications are hereby expressly incorporated herein by reference in their entirety.

TECHNICAL FIELD AND BACKGROUND ART

The present invention generally relates to a transporter and method for transporting one or more persons, and more particularly, to a transporter whose sustained motion is controlled, at least in part, by leaning.

A prior art, dynamically balanced transporter 18 whose sustained motion may be controlled by a rider leaning, is shown, in one embodiment, in FIG. 1, which is described, along with other such transporters, in U.S. Pat. Nos. 5,701,965 and 5,971,091, both of which are herein incorporated by reference. Transporter 18 is statically unstable with respect to tipping in the fore-aft plane and requires a control loop to maintain dynamic stability. Transporter 18 includes a support platform 12 for supporting a person 10 over the ground or other surface. A handlebar 14 is attached to the support platform 12 for gripping by the person 10. Ground-contacting elements 13, which may be wheels, are movably attached to the support platform 12 and serve to suspend support platform 12 over the ground. The person 10 stands or sits on the support platform 12 such that transporter 18 of this embodiment may be operated in a manner analogous to a scooter. A control loop is provided so that leaning of the person 10 in a forward or backward direction results in the application of torque to wheel 13 about axle 15 thereby causing an acceleration of the transporter 18. The control loop actively maintains stability of the transporter 18, typically by keeping the center of mass of the vehicle above the point of contact of the ground-contacting elements with the ground, regardless of disturbances and forces operative on the transporter 18.

Another such prior art transporter whose motion is controlled by leaning is shown in FIG. 2, which is described, along with other such transporters, in U.S. provisional patent application Ser. No. 60/395,589, which is herein incorporated by reference. Unlike the transporter described in FIG. 1, transporter 20 in FIG. 2 is statically stable to tipping in the fore-aft plane. Transporter 20 includes a support platform 21 for supporting a person. Support platform 21 is flexibly coupled to wheels 23, 24, such that the attitude of the support platform 21 is capable of variation based on the load's center of mass relative to the wheels. Such variation may, for example, be caused by an operator leaning on the support platform 21. A sensor module 27, 28 generates a signal characterizing the attitude of the support platform. Based at least on the attitude, a controller commands sustained motion of transporter 20.

As discussed above, sustained motion of each of the above-described transporters may be controlled, at least in part, by a subject leaning on a support platform. However, a problem arises when there is more than one rider. While it may be relatively simple for a single rider to lean in a given direction so as to control the motion of the transporter, placement of a second person on the transporter may make it hard or impossible for either person to govern motion of the device by leaning.

SUMMARY OF THE INVENTION

In a first embodiment of the invention there is provided a transporter for transporting a first user and at least one additional person, each referred to herein as a 'rider', over a surface. The transporter includes a first support platform for supporting the first person, the first support platform having left and right sides and defining a fore-aft vertical plane and a lateral plane. At least one ground-contacting element is coupled to the first support platform such that the first support platform is capable of tilting in the fore-aft plane about a tilt axis. The ground-contacting element is driven by a motorized drive arrangement so as to cause locomotion of the transporter. A controller commands the motorized drive arrangement. The controller is configured so that at least one of fore and aft sustained motion of the transporter is based at least on fore-aft tilting of the first support platform.

The at least one additional rider can be supported by one or more passenger platforms. At least one of the passenger platforms may be coupled to the first support platform such that fore-aft tilting of the first support platform is substantially independent of the passenger platforms. At least one auxiliary ground-contacting element may be coupled to at least one passenger platform.

In accordance with related embodiments of the invention, the first support platform includes a pivot member. The pivot member is characterized by a pivot axis proximate to said tilt axis for coupling at least one of the passenger platforms to the first support platform, the pivot axis being perpendicular to the fore-aft plane. The pivot axis may coincide with said tilt axis.

In other related embodiments of the invention, at least one of the passenger platforms includes an arm having an end for coupling to the pivot member. The arm may be shaped so as to avoid contact with the first platform when the first platform is tilting. The at least one auxiliary ground-contacting element may be a wheel, ski, or skid, which may swivel about a vertical axis in response to turns made by the transporter. The weight of the rider may be borne primarily by the at least one auxiliary ground-contacting element. At least one of the passenger platforms may include at least one seat.

In accordance with further related embodiments of the invention, at least one of the passenger platforms is coupled to the first platform via a ball joint or a U-joint. At least one of the passenger platforms may include a substantially vertical support column. At least one of the passenger platforms may include both a right support platform for supporting a rider's first foot, and a left support platform for supporting the rider's second foot. The controller may command the motorized drive arrangement such that stability of the first support platform is dynamically maintained.

In accordance with another embodiment of the invention, there is provided a transporter for supporting a first user and at least one rider over a surface, each rider having a first and second foot. The transporter includes a first support platform for supporting the first rider, the first support platform having left and right sides and defining a fore-aft vertical plane and a lateral plane. At least one ground-contacting element is coupled to the first support platform such that the first support platform is capable of tilting in the fore-aft plane. The at least one ground-contacting element is driven by a motorized drive arrangement so as to cause locomotion of the transporter. A controller commands the motorized drive arrangement. The controller is configured so that at least one of fore and aft motion of the transporter is based at least on tilting of the first support platform. The transporter also includes one or more right support platforms for supporting the first foot of the at least one rider, and one or more left support platforms for supporting the left foot of the at least one rider.

In related embodiments of the invention, at least one of the right support platforms and at least one of the left support platforms are coupled to the first support platform such that fore-aft tilting of the first support platform is substantially independent of the at least one of the right support platforms and the at least one of the left support platforms. At least one right ground-contacting element may be coupled to at least one of the right support platforms, and at least one left ground-contacting element may be coupled to at least one of the left support platforms. The controller may command the motorized drive arrangement such that stability of the first platform is dynamically maintained. The right and left ground-contacting elements may be one of a wheel, a ski and a skid.

In another related embodiment of the invention, the first support platform includes a first and second pivot member. The first pivot member is characterized by a first pivot axis proximate to said tilt axis for coupling at least one of the right support platforms to the first support platform. The second pivot member is characterized by a second pivot axis proximate to said tilt axis, for coupling at least one of the left support platforms to the first support platform. Both the first and second pivot axes are perpendicular to the fore-aft plane.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
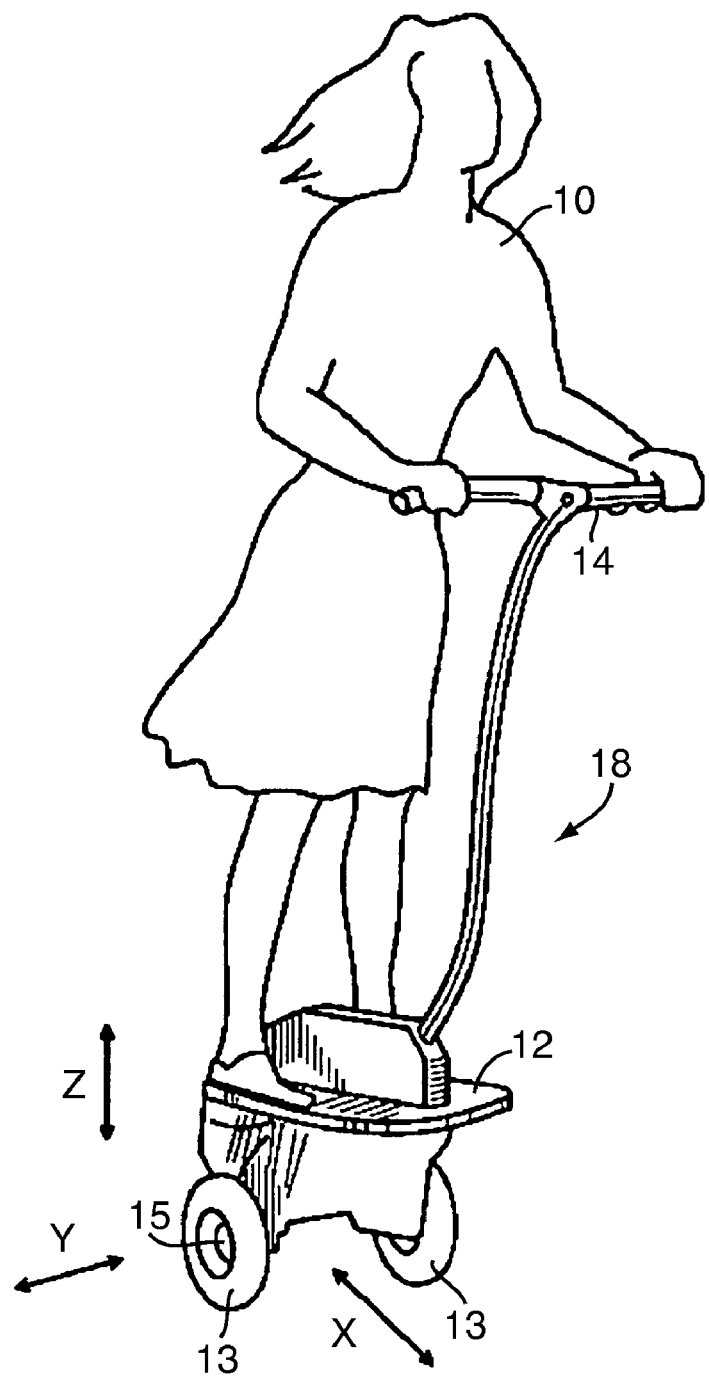
FIG. 1 is a side view of a prior art dynamically balancing transporter whose sustained motion is controlled by leaning on a support platform.
Figure 2:
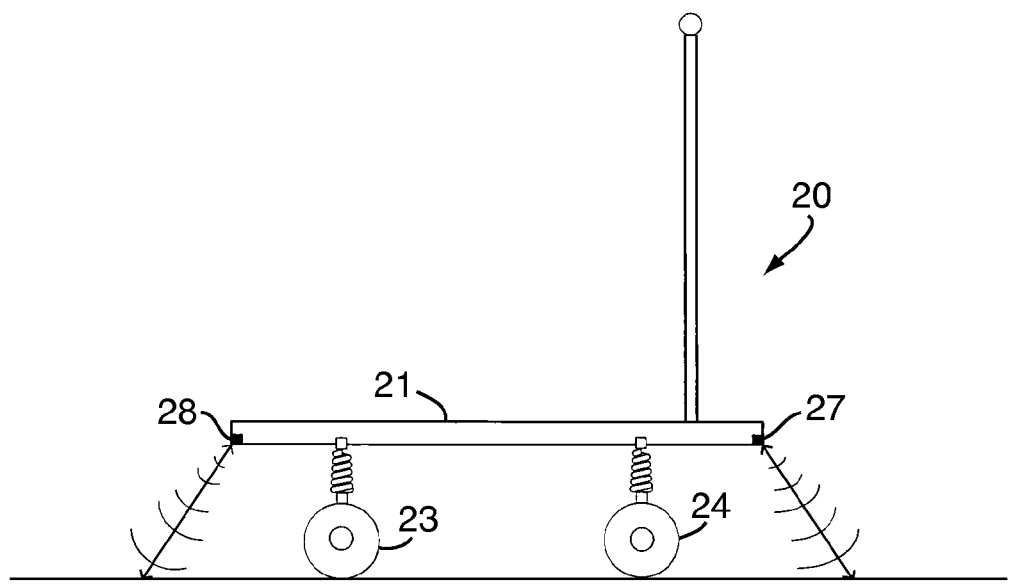
FIG. 2 is a side view of a prior art transporter, statically stable in the fore-aft plane, whose sustained motion is controlled by leaning on a support platform.
Figure 3:
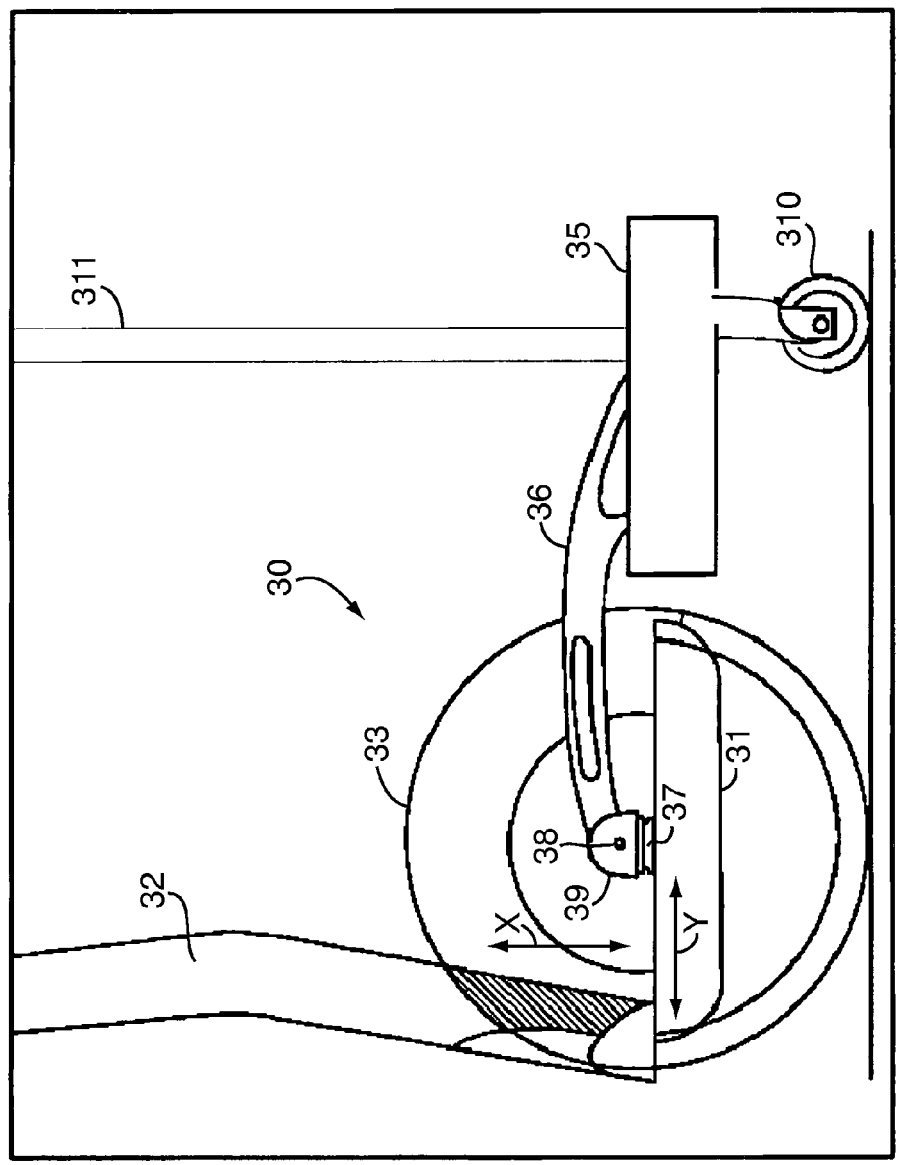
FIG. 3 is a side view of a transporter built for two or more riders, in accordance with one embodiment of the invention.
Figure 4:
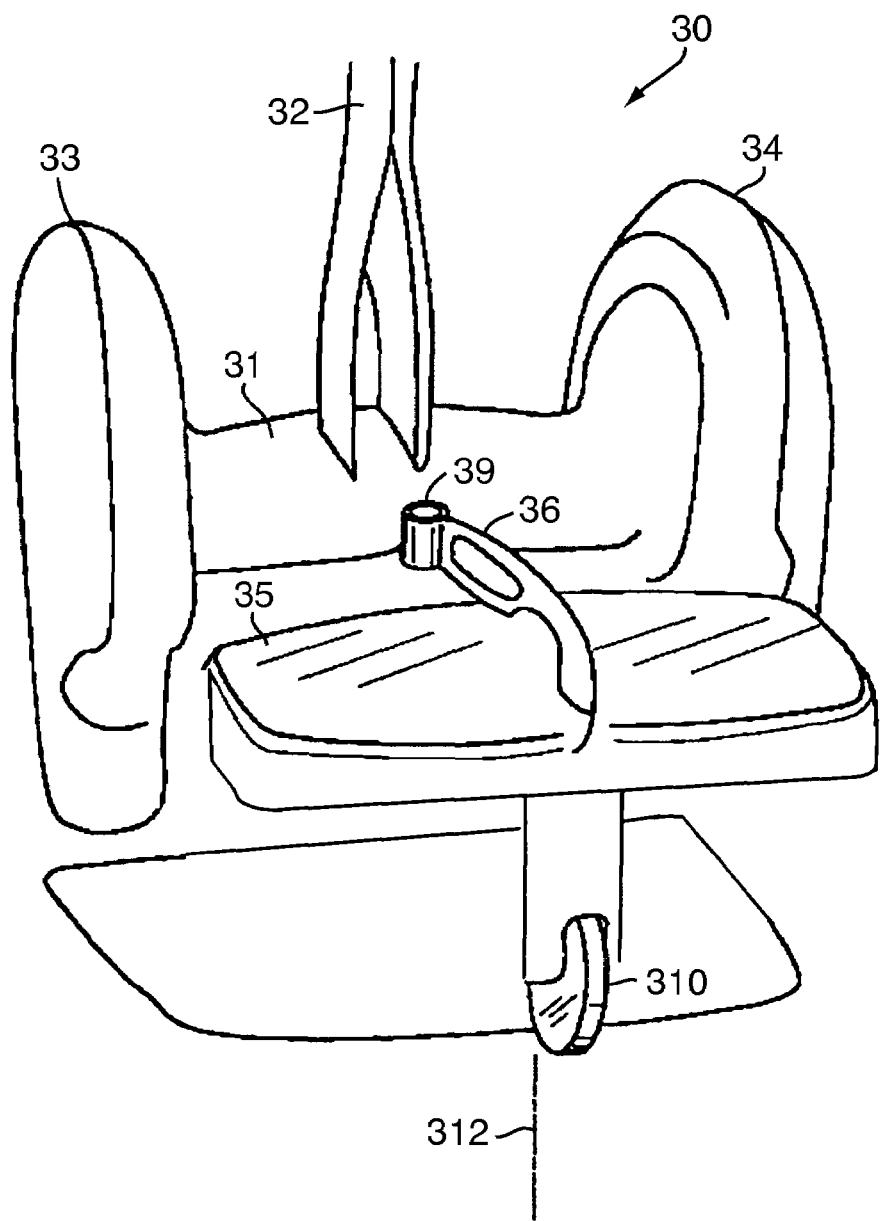
FIG. 4 is a perspective view of a transporter built for two or more riders, in accordance with one embodiment of the invention.

In accordance with one embodiment of the invention, FIGS. 3 and 4 show a side and perspective view, respectively, of a transporter 30 for transporting riders, over the ground or other surface, which may be referred to herein generally as ground. Transporter 30 may be a dynamically balanced transporter, or alternatively, may be statically stable with respect to tipping. Transporter 30 includes a first support platform. A first rider may, for example, stand or sit on first support platform 31. Attached to first support platform 31 may be a handlebar 32 that can be gripped by a rider while situated on first support platform 31.

Coupled to first support platform 31 are one or more ground-contacting elements 33, 34, which provide contact between first support platform 31 and the ground. Ground-contacting elements 33, 34 may include, but are not limited to, arcuate members, tracks, treads, and wheels (hereinafter the term "wheel" will be used in the specification to refer to any such ground-contacting elements).

First support platform 31 is characterized by a fore-aft axis and a lateral axis. The fore-aft axis, X-X, is perpendicular to the axis of the wheels, while the lateral axis, Y-Y, is parallel to the axis of the wheels. Directions parallel to the axes X-X and Y-Y are called the fore-aft and lateral directions, respectively.

Wheels 33, 34 are coupled to first support platform 31 such that first support platform 31 is capable of tilting in the fore-aft plane about a tilt axis. First support platform 31 may be coupled to the wheels 33, 34 by various means known in the art, such as by a pivot mechanism, springs, or pneumatic pistons.

Motion of the transporter 30 is controlled, at least in part, by fore-aft tilting of first support platform 31. To determine fore-aft tilting of first support platform 31, transporter 30 includes a sensor module. Sensor module includes at least one sensor for generating a signal characteristic of the fore-aft tilting of first support platform 31. The at least one sensor may include, without limitation, a gyroscope, an inclinometer, a load sensor, an attitude sensor, or a proximity sensor, either alone or in combination.

A controller receives the signal characteristic of the fore-aft tilting of first support platform 31 from the sensor module. Based at least on this signal, the controller implements a control algorithm to command a motorized drive arrangement that drives the one or more wheels 33, 34 so as to cause locomotion of transporter 30. The controller may also respond to commands from other operator interfaces, such as a joystick or dial attached, for example, to handlebar 32.

Figure 5:
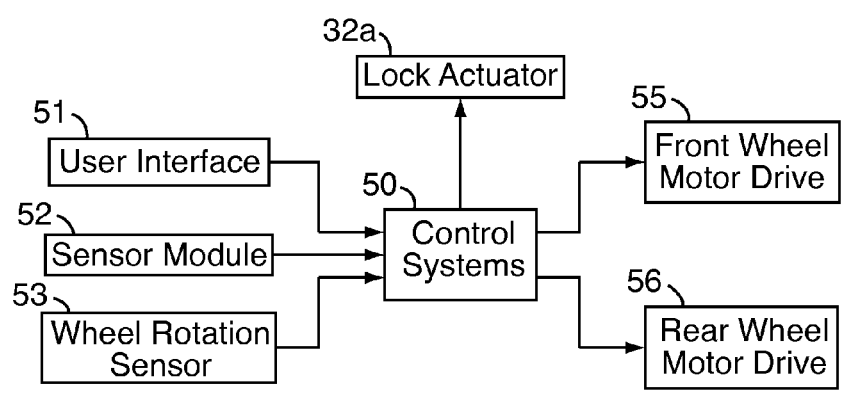
FIG. 5 is a block diagram of a controller of a transporter, in accordance with one embodiment of the invention.

FIG. 5 is a block diagram of a controller 50 for controlling the motorized drive of the transporter, in accordance with one embodiment of the invention. Controller 50 interfaces with user interface 51, a sensor module 52, and a wheel rotation sensor 53. Controller 50 receives an input characteristic of the fore-aft tilting of the support platform from sensor module 52. Based at least on the input from sensor module 52, controller 50 commands at least one motorized drive 55, 56. User interface 51 may include, for example, controls for turning the controller 50 on or off. User interface may also control a locking mechanism 32a for locking wheels 33, 34 (see FIG. 4).

Controller 50 includes a control algorithm for determining the amount of torque to be applied to the at least one wheel based on the sensed fore-aft tilt of the support platform. The control algorithm may be configured either in design of the system or in real time, on the basis of current operating mode and operating conditions as well as preferences of the user. Controller may implement the control algorithm by using a control loop. The operation of control loops is well known in the art of electromechanical engineering and is outlined, for example, in Fraser & Milne, Electro-Mechanical Engineering, IEEE Press (1994), particularly in Chapter 11, "Principles of Continuous Control" which is incorporated herein by reference.

As an example, and not meant to be limiting, the control algorithm may take the form:

Torque Command to Wheel=K [θ+O]

where K=gain,

θ=fore-aft tilt of the first support platform, and

O=offset.

The fore-aft tilt of first support platform, θ, may be in the form of an error term defined as the desired fore-aft tilt of the first support platform minus the measured fore-aft tilt of the first support platform attitude. The gain, K, may be a predetermined constant, or may be entered/adjusted by the operator through user interface 51. Responsiveness of the transporter to fore-aft tilting of the first support platform can be governed by K. For example, if K is increased, a rider will perceive a stiffer response in that a small change in platform tilt will result in a large torque command. Offset, O, may be incorporated into the control algorithm to govern the torque applied to the motorized drive, either in addition to, or separate from, the direct effect of θ. Thus, for example, the user may provide an input by means of a user interface of any sort, the input being treated by the control system equivalently to a change, for example, in fore-aft tilting of the first support platform.

Thus, referring back to FIGS. 3 and 4, motion of the transporter 30 may be controlled by a subject leaning on the first support platform 31 so as to cause the first support platform 31 to tilt in the fore-aft plane. Depending on the control algorithm, an initial change in the tilt of the platform 31, such that platform 31 is tilted forward, may result in positive torque being applied to one or more wheels 33, 34, causing the wheels 33, 34 to move forward. Likewise, an initial change in the tilt of the platform 31, such that platform 31 is tilted backward, may result in a negative torque applied to one or more wheels 33, 34, causing the wheels 33, 34 to move in the aft direction. If the subject then remains in his changed position on the platform such that platform tilt remains the same, the motor will continue to torque at the same rate.

In accordance with one embodiment of the invention, a passenger platform 35 is coupled to the first support platform 31 such that fore-aft tilting of the first support platform 31 is substantially decoupled from the passenger platform 35. In the embodiment shown in FIGS. 3 and 4, support platform 31 includes a pivot member 39 that is characterized by a pivot axis 38. Passenger platform 35 has an arm 36 pivotally attached, at pivot end 37, to the pivot member 39, allowing arm 36 to rotate about the pivot axis 38 which is horizontal and perpendicular to the fore/aft-vertical plane (i.e. the plane of the paper in FIG. 3). Pivot axis 38 may be positioned proximate to, or may coincide with, the tilt axis of the first support platform 31, so as to minimize the effect that tilting first support platform 31 has on passenger platform 35. Arm 36 may be shaped to avoid contact with first support platform 31 when the rear edge of first support platform 31 is rotated upward.

Passenger platform 35 is capable of supporting a second rider. The second rider may, for example, stand or sit on passenger platform 35. Attached to the passenger platform 35 may be a vertical support column 311 that can be gripped by a rider while situated on passenger platform 35. In various embodiments, a seat is coupled to passenger platform 35.

Passenger platform 35 is supported by at least one auxiliary ground-contacting element 310. Auxiliary ground-contacting element(s) 310 may include, but are not limited to, arcuate members, tracks, treads, skis, and wheels. Auxiliary ground-contacting element(s) may swivel about a vertical axis 312 in response-to turns made by the transporter 30.

During normal operation, pivot member 39 may be free to pivot in the fore/aft vertical plane, and motion is controlled by the subject leaning on the first support platform 31. In a fault condition, where transporter 30 loses the ability to maintain dynamic stability, pivot member 39 may be locked, by activation of a solenoid, for example, in such a manner to prevent passenger platform 35 from tilting forward and transporter 30 from tipping backward. The lock mechanism may be activated, in accordance with various embodiments of the invention, by a control signal or by a power failure. The implementation of the pivot lock and activation of the lock is well known to one of ordinary skill in the mechanical art.

Figure 6A:
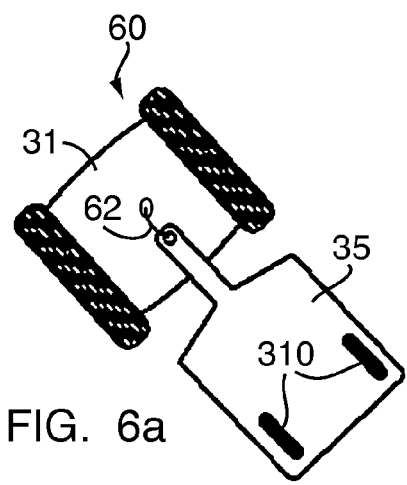
FIGS. 6a and 6b show top views of a transporter that includes a first support platform coupled to a second support platform using a ball joint and universal joint, respectively, in accordance with embodiments of the invention.
Figure 6B:
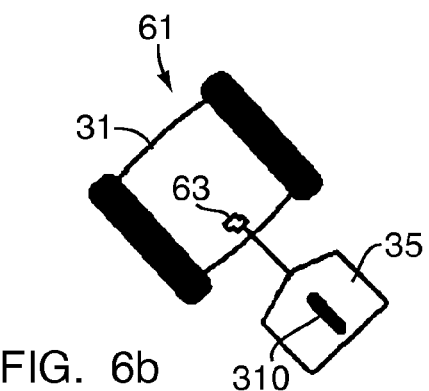

Referring now to FIG. 6a, a bottom view of a transporter 60 is shown of a further embodiment of the invention in which the passenger platform 35 is attached to the first support platform 31 via a ball joint 62, allowing rotation about all axes. Auxiliary ground-contacting element(s) 310 supporting the passenger platform 35 may thus be non-castering. In another embodiment, FIG. 6b shows a bottom view of transporter 61 in which passenger platform 35 is attached to the first support at a universal joint 63, permitting rotation about both pitch and yaw axes. Both of the embodiments of FIGS. 6a and 6b effectively decouple passenger platform 35 from fore/aft leaning of first support platform 31.

Figure 7A:
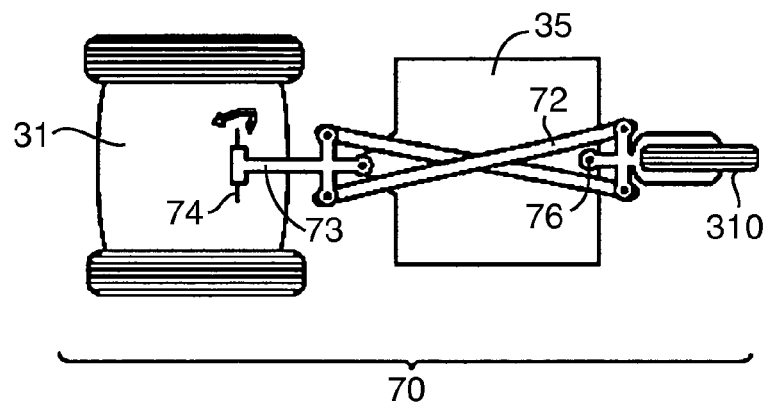
FIGS. 7a and 7b show bottom views of a transporter that includes a first support platform coupled to a second support platform using a scissors linkage, in accordance with one embodiment of the invention.
Figure 7B:
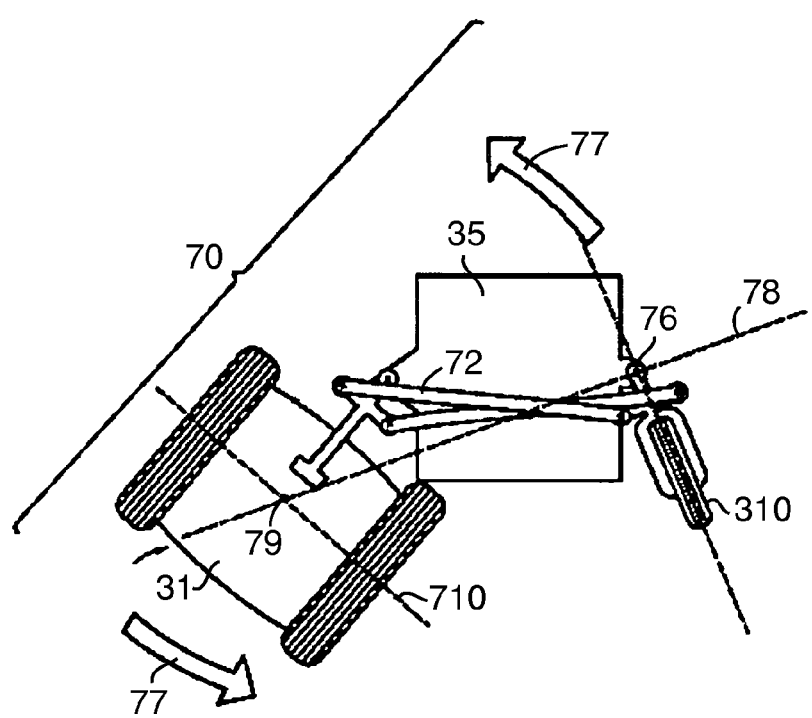

FIGS. 7a and 7b are a bottom view of a transporter 70 in which passenger platform 35 is coupled to first support platform 31 via a scissors linkage 72, in accordance with another embodiment of the invention. Referring first to FIG. 7a, scissors linkage 72 may be coupled to first support platform 31 by means of a hitch 73 that pivots about horizontal (pitch) axis 74 to allow leaning of the transporter. In the embodiment shown in FIGS. 7a and 7b, passenger platform 35 is supported by one or more auxiliary ground-contacting elements 310, such as a track, tread, ski, or wheel (as noted above, hereinafter the term "wheel" will be used in the specification to refer to any such ground-contacting element). Wheel 310 pivots about a vertical (yaw) axis 76 to allow it to track as the transporter executes turns. Scissor linkage 72 provides for steering of wheel 310 to allow for tight turns made by transporter 70. In fact, as depicted in FIG. 7b, transporter 70 may be rotated in place, as shown by arrows 77, to the degree that wheel 310 is perpendicular to line 78 connecting the center 79 of wheel axis 710 of first support platform 31 to vertical axis 76 of steerability of wheel 310, at which point transporter 70 may turn in place.

In the above-described embodiments, first support platform 31 and passenger platform 35 may have a characteristic transverse linear dimension substantially comparable to the shoulder width of a rider. Since the leaning of the respective trailer and transporter components are effectively decoupled, a rider standing on the passenger platform 35 need merely hold onto the rider of the first support platform 31 (i.e. the driver of the transporter 30) in order to maintain balance. Additionally, by exerting force on the rider of the first support platform 31, it is possible for the rider on the passenger platform 35 to drive the transporter 30.

Figure 8:
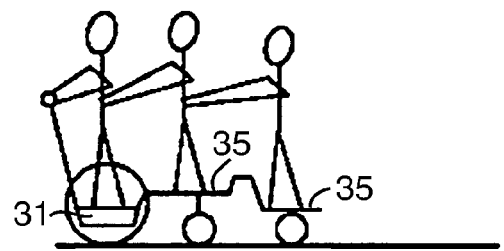
FIG. 8 is a schematic view of multiple support platforms driven by a first support platform of a transporter, in accordance with one embodiment of the invention.

In accordance with various embodiments of the invention, multiple passenger platforms may be attached to the first support platform. For example, the multiple passenger platforms 35 may attached in a serial configuration to the first support platform 31, as shown in FIG. 8. Motion of each of the passenger platforms 35 is controlled via the first support platform 31 via leaning, as described above. Passenger platforms may also be coupled to the left and/or right side of the first support platform 31.

Figure 9:
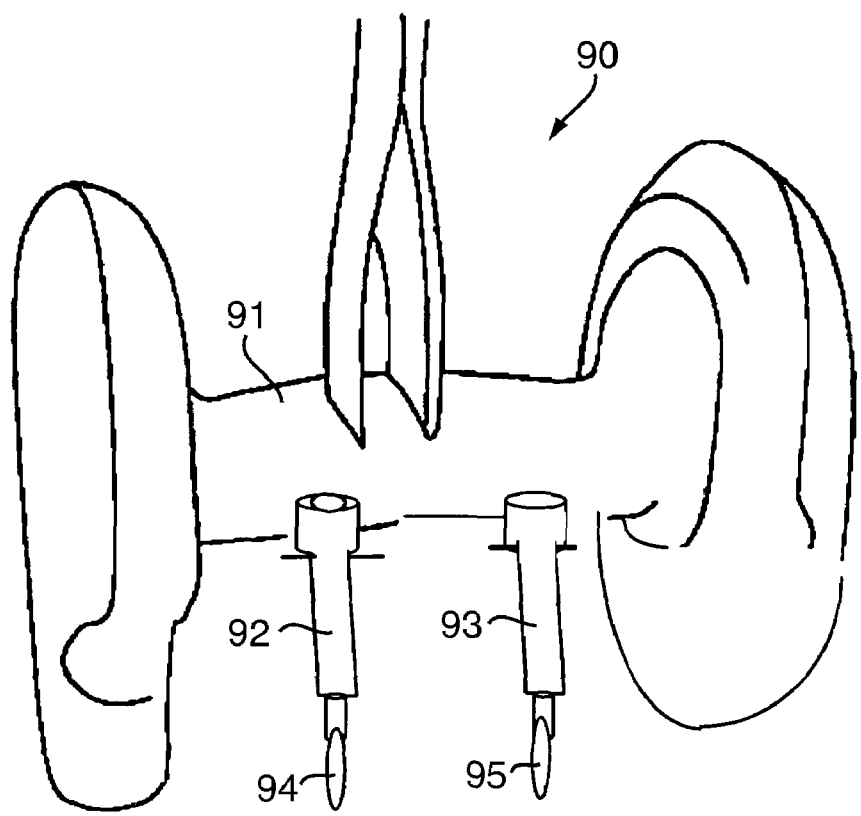
FIG. 9 is a transporter that includes a second and third support platform, in accordance with one embodiment of the invention.

FIG. 9 is a transporter 90 that includes two passenger platforms coupled to the first support platform 91, in accordance with one embodiment of the invention. A left support platform 92 is coupled to the first support platform 91 for supporting a first foot of a second rider riding on the second support platform 92, while a right support platform 93 is coupled to the first support platform 91 for supporting the second foot of the second rider. Both the left support platform 92 and right support platform 93 may be coupled to the first support platform 91, such that fore-aft tilting of the first support platform 91 is substantially independent of the platforms 91 and 92. Left and right support platforms 92 and 93 may be coupled to the first support platform 91 using, without limitation, a pivot member, a ball joint, a universal joint, or a scissors linkage, as described in above embodiments.

Figure 10:
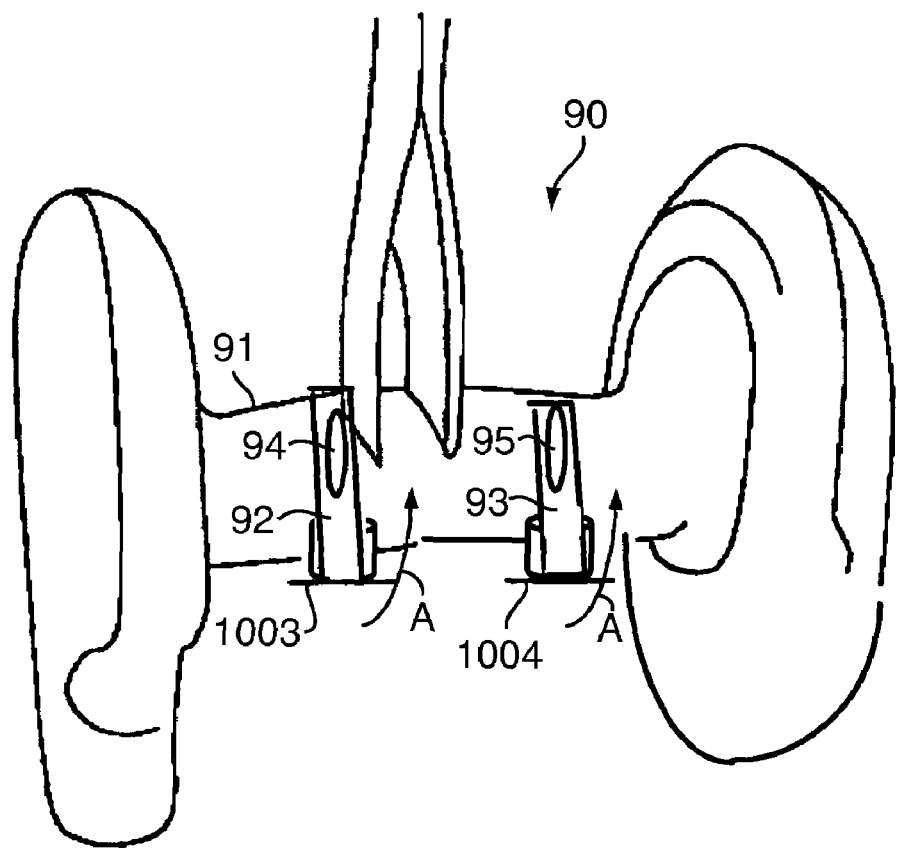
FIG. 10 is a transporter that includes second and third support platforms positioned in non-obtrusive position, in accordance with one embodiment of the invention.

Each of the support platforms 92 and 93 may be supported by one or more ground contacting elements 94 and 95. Ground-contacting elements 94 and 95 may be, without limitation, an arcuate member, a track, a tread, a ski, or a wheel. Left and right support platforms 92 and 93 may be positioned in an unobtrusive position when not in use, such as when only a single rider is using transporter. For, example, in one embodiment, both the left support platform 92 and the right support platform 93 can be rotated in a direction A around pivot members 1003 1004, respectively, as shown in FIG. 10. A locking mechanism can then be used to lock support platforms 92 and 93, such that support platforms 92 and 93 are in a fixed vertical position when not in use.

In accordance with another embodiment of the invention, the passenger platform 35, as shown in FIGS. 3-7, or both the left support platform 92 and right support platform 93, as shown in FIGS. 9 and 10, are coupled to first support platform such that the tilting of the first support platform in the fore-aft plane is not decoupled from the passenger platform 35, or left and right support platforms 92 and 93, respectively. In such embodiments, the passenger platform 35 or left and right support platforms 92 and 93 may not be supported by ground-contacting elements. To account for the additional weight of support platforms, and additional riders, that would tend to tilt the first support platform in the aft direction, the first rider may have to lean further forward or stand more towards the front of the first support platform. First support platform may also include a weight transfer mechanism, so as to adjust tilt of the first support platform in the fore/aft plane when the first user and riders are, for example, in an initial or comfortable position. Passenger platform 35 or left/right support platforms 92 and 93 may be cantilevered to first support platform, such that when the platforms 35 and 92 and 93 are not in use, they are in an unobtrusive position, similar to the embodiment shown in FIG. 10. When in use, the weight of the second rider on the passenger platform 35 or support platforms 92 and 93 allow the second rider to be supported in an upright position.

The described embodiments of the invention are intended to be merely exemplary and numerous variations and modifications will be apparent to those skilled in the art. All such variations and modifications are intended to be within the scope of the present invention.

What is claimed is:

1. A transporter for supporting a first user and at least one rider over a surface, each rider having a first and second foot, the transporter comprising:
    a first support platform for supporting the first user, the first support platform having left and right sides and defining a fore-aft vertical plane and a lateral plane;
    at least one ground-contacting element coupled to the first support platform such that the first support platform is capable of tilting in the fore-aft plane;
    a motorized drive arrangement for driving the at least one ground-contacting element so as to cause locomotion of the transporter;
    a controller for commanding the motorized drive arrangement, the controller configured so that at least one of fore and aft motion of the transporter is based at least on tilting of the first support platform;
    one or more right support platforms for supporting the first foot of the at least one rider; and
    one or more left support platforms for supporting the second foot of the at least one rider.

2. The transporter according to claim 1, wherein at least one right ground-contacting element is coupled to at least one of the right support platforms; and wherein at least one left ground-contacting element is coupled to at least one of the left support platforms.

3. The transporter according to claim 1, wherein at least one of the right support platforms is coupled to the first support platform such that fore-aft tilting of the first support platform is substantially independent of the at least one of the right support platforms, and wherein at least one of the left support platforms is coupled to the first support platform such that fore-aft tilting of the first support platform is substantially independent of the at least one of the left support platforms.

4. The transporter according to claim 1, wherein the controller commands the motorized drive arrangement such that stability of the first platform is dynamically maintained.

5. The transporter according to claim 1, wherein the right and left ground-contacting elements are one of a wheel, a ski and a skid.

6. The transporter according to claim 1, wherein the first support platform includes:
    a first pivot member characterized by a first pivot axis proximate to said tilt axis for coupling at least one of the right support platforms to the first support platform; and
    a second pivot member characterized by a second pivot axis proximate to said tilt axis, for coupling the at least one of the left support platforms to the first support platform, wherein the first and second pivot axis are perpendicular to the fore-aft plane.

7. A method of using a transporter to transport a first user and at least one rider over a surface, the at least one rider having a first and second foot, the method comprising:
    supporting the first user on a first support platform, the first support platform defining a fore-aft vertical plane and a lateral plane, the first support platform coupled to at least one ground-contacting element such that the first support platform is capable of tilting in the fore-aft plane;
    supporting the first foot of the at least one rider on a right support platform, the right support platform coupled to the first support platform such that fore-aft tilting of the first support platform is substantially independent of the right support platform, the right support platform coupled to at least one right ground-contacting element;
    supporting the second foot of the at least one rider on a left support platform, the left support platform coupled to the first support platform such that fore-aft tilting of the first support platform is substantially independent of the left support platform, the left support platform coupled to at least one right ground-contacting element such that sustained motion of the transporter is based at least on fore-aft tilting of the first support platform.

8. The method according to claim 7, wherein controlling the motorized drive arrangement is based at least on maintaining dynamic stability of the first support platform.

* * * * *